US012675680B2

(12) United States Patent
Sun

(10) Patent No.: US 12,675,680 B2
(45) Date of Patent: Jul. 7, 2026

(54) DATA PROCESSING METHOD AND DEVICE, AND NEURAL NETWORK PROCESSING DEVICE

(71) Applicant: Beijing ESWIN Computing Technology Co., Ltd., Beijing (CN)

(72) Inventor: Fuhai Sun, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 803 days.

(21) Appl. No.: 18/087,956

(22) Filed: Dec. 23, 2022

(65) Prior Publication Data

US 2023/0206049 A1    Jun. 29, 2023

(30) Foreign Application Priority Data

Dec. 23, 2021    (CN) .......................... 202111590435.2

(51) Int. Cl.
*G06N 3/063*        (2023.01)
(52) U.S. Cl.
CPC .................................... *G06N 3/063* (2013.01)
(58) Field of Classification Search
CPC ...................................................... G06N 3/063
USPC ........................................................... 709/246
See application file for complete search history.

(56) References Cited

U.S. PATENT DOCUMENTS

| | | | | |
|---|---|---|---|---|
| 2020/0410337 A1* | 12/2020 | Huang | ..................... | G06N 3/04 |
| 2021/0182077 A1* | 6/2021 | Chen | ......................... | G06T 1/60 |
| 2022/0066760 A1* | 3/2022 | Chang | ...................... | G06F 8/41 |
| 2022/0137866 A1* | 5/2022 | Kim | ...................... | G06F 3/0679 |
| | | | | 711/154 |
| 2022/0309317 A1* | 9/2022 | Nama | ....................... | G06T 1/20 |
| 2022/0343134 A1* | 10/2022 | Chu | ....................... | G06N 3/084 |
| 2023/0040673 A1* | 2/2023 | Croxford | ................. | G06N 3/08 |
| 2024/0386260 A1* | 11/2024 | Akin | ....................... | G06N 3/063 |

FOREIGN PATENT DOCUMENTS

CN          112099737 A  * 12/2020  ............. G06N 3/045

* cited by examiner

*Primary Examiner* — Frantz B Jean
(74) *Attorney, Agent, or Firm* — Carter, DeLuca & Farrell LLP

(57)            ABSTRACT

A data processing method and device for a neural network, a neural network processing device, and a storage medium. The neural network includes a plurality of network layers, the plurality of network layers include a first network layer, and the method includes: receiving at least two output feature data subsets, obtained by a processing circuit array for at least two different portions of the first network layer, from the processing circuit array; splicing and combining the at least two output feature data subsets according to positions of the at least two different portions in the first network layer to obtain a reorganized data subset; and writing the reorganized data subset into a destination storage device. The data processing method for neural network processing may be capable of improving system efficiency and improving bus bandwidth utilization.

18 Claims, 7 Drawing Sheets

(a)                    (b)                    (c)

Convolution Kernel First Row

Convolution Kernel Second Row

Convolution Kernel Third Row (a)

Input Feature Map First Row

Input Feature Map Second Row

Input Feature Map Third Row

Input Feature Map Fourth Row

Input Feature Map Fifth Row (b)

Accumulated Sum First Row

Accumulated Sum Second Row

Accumulated Sum Third Row (c)

PE Array: 12 row × 12 column

PE Array: 12 row × 12 column

S101

Receiving at least two output feature data subsets, obtained by a processing circuit array for at least two different portions of the first network layer, from the processing circuit array

S102

Splicing and combining the at least two output feature data subsets according to positions of the at least two different portions in the first network layer to obtain a reorganized data subset

S103

Writing the reorganized data subset into a destination storage device

FIG. 4

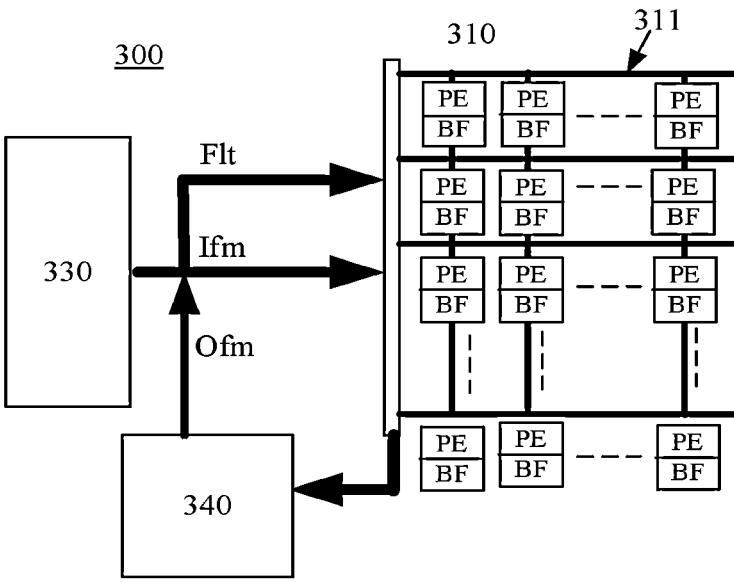

FIG. 5

DATA PROCESSING METHOD AND DEVICE, AND NEURAL NETWORK PROCESSING DEVICE

CROSS REFERENCE

The application claims priority to Chinese patent application No. 202111590435.2, filed on Dec. 23, 2021, the entire disclosure of which is incorporated herein by reference as part of the present application.

TECHNICAL FIELD

Embodiments of the present disclosure relate to a data processing method and device, and a neural network processing device.

BACKGROUND

Artificial intelligence is a frontier and comprehensive discipline that integrates computer science, statistical science, brain neurology and social science. Research in artificial intelligence application field includes robotics, speech recognition, image recognition, natural language processing, and expert systems. At present, in the field of artificial intelligence, deep learning technology has achieved very good results in image recognition, speech recognition, automatic driving and other applications. Deep learning involves, for example, convolutional neural networks (CNN), deep neural networks (DNN), recurrent neural networks (RNN), etc. These neural networks all have the characteristics of a large number of parameters, a large amount of computation, and a high degree of parallelism.

However, the traditional methods of using CPU, GPU, etc. for neural network processing are not suitable for the above-mentioned computing characteristics of a large number of parameters, a large amount of computation, and a high degree of parallelism. Therefore, it becomes very necessary to design a special processor for the field of deep learning.

SUMMARY

At least one embodiment of the present disclosure provides a data processing method for a neural network, the neural network comprising a plurality of network layers, the plurality of network layers comprising a first network layer, and the method comprising: receiving at least two output feature data subsets, obtained by a processing circuit array for at least two different portions of the first network layer, from the processing circuit array; splicing and combining the at least two output feature data subsets according to positions of the at least two different portions in the first network layer to obtain a reorganized data subset; and writing the reorganized data subset into a destination storage device.

At least one embodiment of the present disclosure provides a data processing device for a neural network, the neural network comprising a plurality of network layers, the plurality of network layers comprising a first network layer, and the device comprising a receiving circuit, a reorganization circuit and a writing circuit. The receiving circuit is configured to receive at least two output feature data subsets, obtained by a processing circuit array for at least two different portions of the first network layer, from the processing circuit array; the reorganization circuit is configured to splice and combine the at least two output feature data subsets according to positions of the at least two different portions in the first network layer to obtain a reorganized data subset; and the writing circuit is configured to write the reorganized data subset into a destination storage device.

At least one embodiment of the present disclosure provides a data processing device for a neural network, comprising a processing circuit and a memory on which one or more computer program modules are stored, wherein the one or more computer program modules are configured to, when executed by the processing circuit, perform the above-mentioned data processing method.

At least one embodiment of the present disclosure provides a non-transitory readable storage medium, wherein computer instructions are stored on the non-transitory readable storage medium, and the computer instructions, when executed by a processor, perform the above-mentioned data processing method.

At least one embodiment of the present disclosure provides a neural network processing device, comprising the above-mentioned data processing device, the processing circuit array, and the destination storage device, wherein the data processing device is coupled to the processing circuit array and the destination storage device.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

FIG. 4 illustrates a schematic diagram of a data processing method for a neural network provided by at least one embodiment of the present disclosure;

FIG. 5 illustrates a schematic diagram of a neural network processing device provided by another embodiment of the present disclosure;

DETAILED DESCRIPTION

Figure 1A:
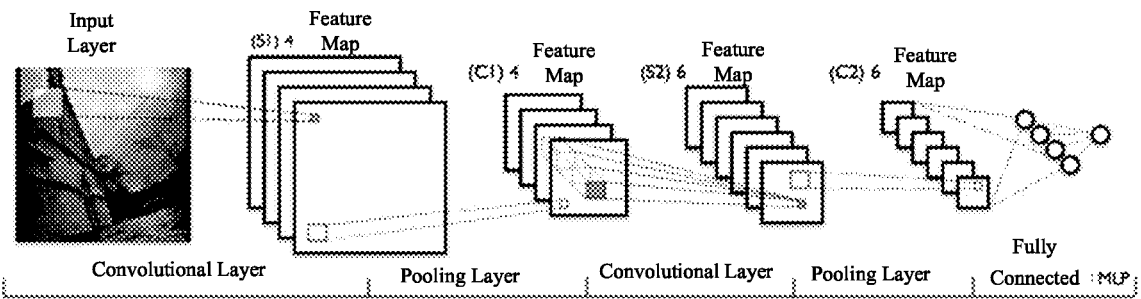
FIG. 1A abstractly illustrates an input and an output of a neuron in a convolutional neural network.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

In order to make the following description of the embodiments of the present disclosure clear and concise, the present disclosure omits a detailed description of some well-known functions and well-known components.

Neural network is a mathematical computational model inspired by the structure of brain neurons and the principle of neural conduction. The method to achieve intelligent computing based on this kind of model is called brain-inspired computing. For example, neural networks include various forms of network structures, such as back propagation (BP) neural networks, convolutional neural networks (CNN), recurrent neural networks (RNN), long short-term memory networks (LSTM), etc. For example, convolutional neural networks may also be subdivided into fully convolutional networks, deep convolutional networks, U-shaped networks (U-Net), etc.

For example, a common convolutional neural network usually includes an input terminal, an output terminal, and a plurality of processing layers. For example, the input terminal is configured to receive data to be processed, such as images to be processed, and the output terminal is configured to output processing results, such as processed images. These processing layers may include convolutional layers, pooling layers, batch normalization (BN) layers, fully connected layers, etc. According to different structures of the convolutional neural networks, these processing layers may include different contents and combinations. After the input data is input into the convolutional neural network, the corresponding output is obtained through several processing layers. For example, the input data may be convolved, upsampled, downsampled, normalized, fully connected, flattened, and other operations through several processing layers.

The convolutional layer is a core layer of the convolutional neural network, several filters are applied to the input data (input image or input feature map), and the input data is used for various types of feature extraction. The result of applying a filter to the input data is called a feature map, and the amount of feature maps is equal to the amount of filters. A feature map output by one convolutional layer may be input to a convolutional layer of the next level and processed again to obtain a new feature map. The pooling layer is an intermediate layer sandwiched between consecutive convolutional layers, which is configured to reduce the size of the input data and reduce the phenomenon of overfitting to a certain extent. There are many methods to implement pooling, these methods include but are not limited to: max-pooling, avg-pooling, random pooling, decimation (such as choosing fixed pixels), demuxout (splitting the input image into multiple smaller images), etc. Usually the last subsampling layer or convolutional layer is connected to one or more fully connected layers, the output of the fully connected layer is served as the final output, and a one-dimensional matrix, that is, a vector, may be obtained.

FIG. 1A abstractly illustrates an input and an output of a neuron in a convolutional neural network. As illustrated in FIG. 1A, C1, C2 to Cn refer to different signal channels. For a local receptive field (the local receptive field contains multiple channels), different filters are used to convolve the data on the C1 to Cn signal channels of the local receptive field, the convolution result is input to a stimulus node, and the stimulus node performs calculation according to a corresponding function to obtain feature information. For example, the convolutional neural network is usually a deep convolutional neural network and may include at least five convolutional layers. For example, the VGG-16 neural network includes 16 layers, while the GoogLeNet neural network includes 22 layers, of course, other neural network structures may include more processing layers, the above-mentioned content is only an exemplary description of the neural network, and the present disclosure does not limit the structure of the neural network.

Figure 1B:
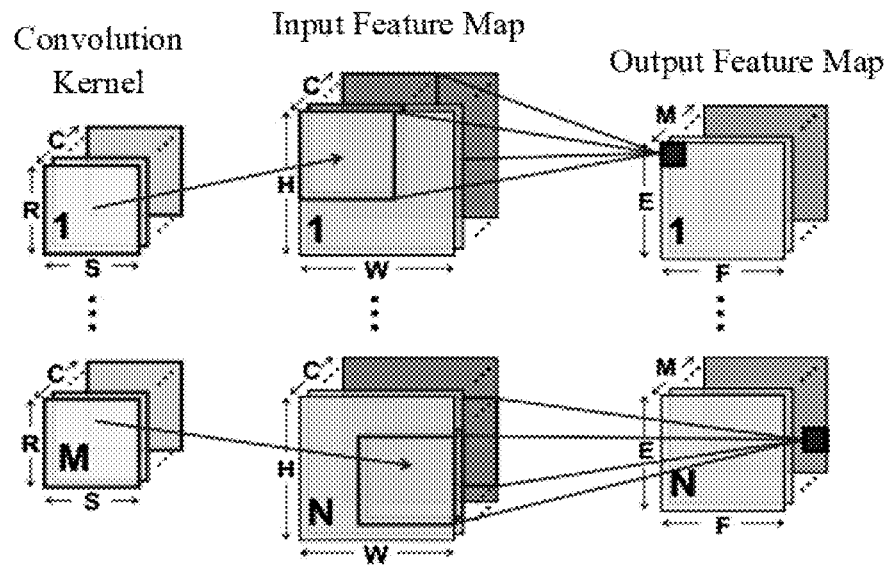
FIG. 1B illustrates a schematic diagram of a convolutional layer performing multi-channel convolutional operations.

FIG. 1B illustrates a schematic diagram of a convolutional layer performing multi-channel convolutional operations. As illustrated in FIG. 1B, convolutional operations are performed on N groups of H×W input images (or input feature maps) with C channels, using M groups of R×S convolution kernels with C channels, to obtain N groups of E×F output feature maps with M channels, respectively, so the output feature maps generally include multiple dimensions of F/E/M.

Figure 1C:
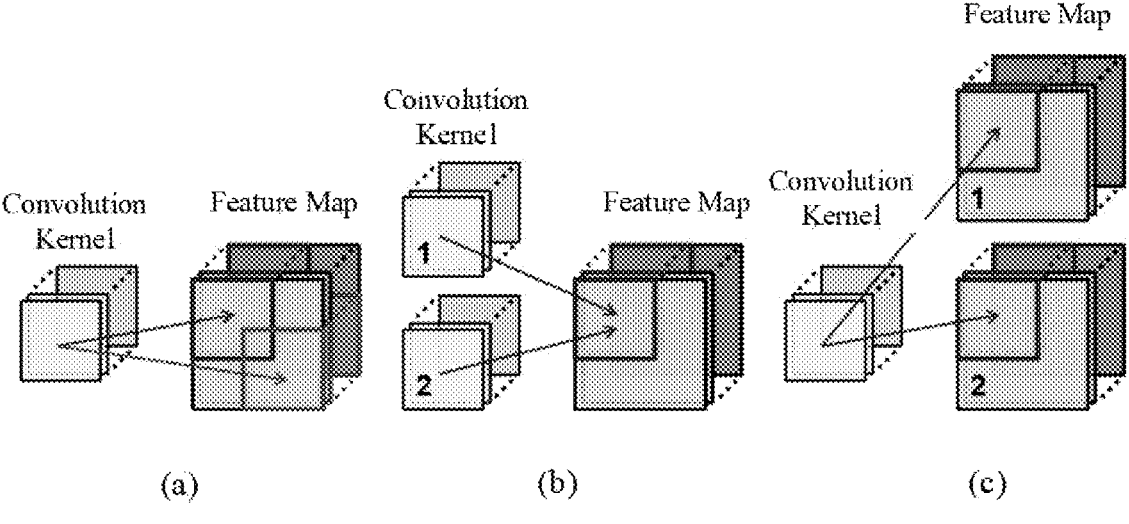
FIG. 1C illustrates the features of data multiplexing in convolutional operations.

The convolutional operation has the characteristics of high parallelism and high data multiplexing. The high parallelism is reflected in the fact that multiple convolution kernels can be operated simultaneously with multiple input feature maps. FIG. 1C illustrates the characteristic of data multiplexing in the convolutional operation. As illustrated in FIG. 1C, the high data multiplexing in the convolutional operation is reflected in the following aspects:

(a) Multiplexing of a convolutional operation: a convolution kernel is operated with multiple pixels in an input feature map (such as a multi-channel input feature map);

(b) Multiplexing of an input feature map: an input feature map is operated with multiple convolution kernels (such as a multi-channel convolution kernel);

(c) Multiplexing of a convolution kernel: a convolution kernel (such as a multi-channel convolution kernel) is operated with multiple input feature maps (such as a multi-channel input feature map).

Moreover, because the amount of computation of neural networks, especially for convolutional layers with a large-sized input feature map, is very large, it is usually necessary to decompose the computational operation of a convolutional layer in a neural network. For example, the convolutional operations of different parts of the same convolutional layer may be performed independently of each other, and these decomposed tasks are computed in parallel by multiple processing circuits, and then computation results of these processing circuits are combined to obtain the computation result of the entire convolutional layer. Then the computation result of the convolutional layer may be served as an input of the next convolutional layer.

Neural-network Processing Unit (NPU) is a class of microprocessors or computing systems dedicated to hardware acceleration of artificial intelligence (especially artificial neural networks, machine vision, machine learning, etc.), sometimes referred to as AI Accelerator.

Figure 2A:
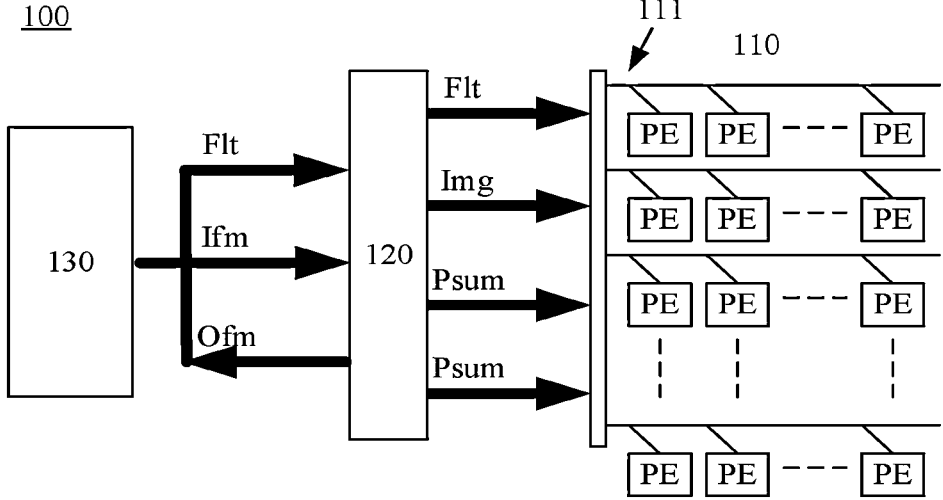
FIG. 2A illustrates a schematic diagram of an architecture of a Neural-network Processing Unit.

FIG. 2A illustrates a schematic diagram of an architecture of a Neural-network Processing Unit. As illustrated in FIG. 2A, the Neural-network Processing Unit includes a processing circuit (PE) array 110, a global cache 120 and a memory 130. The processing circuit array 110 includes multiple rows and columns (e.g., 12 rows×12 columns) of processing circuits that are coupled to each other through an on-chip interconnect and share a global cache 120, and the on-chip interconnect is, for example, a network on chip (NoC). Each processing circuit has a computing function and may also have, for example, its own local cache, such as a cache or register array including a multiply-accumulator (MAC) and a vector (or matrix) for buffering the inputs. Each PE can access other PEs around it, the PE's own local cache and the global cache. The global cache 120 is further coupled to the memory 130 through, for example, a bus.

In the working process, for example, the data of the convolution kernel (Flt), the input feature map (Ifm), etc. required for computation of a network layer (e.g., a convolutional layer) is read from the memory 130 into the global cache 120, and then from the global cache 120, the convolution kernel (Flt) and the input image (Img) are input to the processing circuit array 110 for computation, and the computation tasks for different image pixels are allocated to different processing circuits (i.e., for mapping). The partial accumulated sum (Psum1) generated during the computation process is temporarily stored in the global cache, and if the partial accumulated sum (Psum1) generated previously is required for further accumulated operation in subsequent computation, the required partial accumulated sum (Psum2) may be read from the global cache 120 into the processing circuit array 110 for operation. The output feature map (Ofm) obtained by completing the operation of one convolutional layer may be output from the global cache 120 to the memory 130 for storage, for example, the output feature map may be used for the computation of the next network layer (e.g., a convolutional layer).

For example, for the data generated by the processing circuit array 110, especially in the case of sparse matrices, these data may be compressed and stored; a compression method for sparse matrices is RLC encoding, which can save storage space by encoding consecutive zeros into the amount of zeros. During the process of storing data from the processing circuit array 110 into the memory 130, an encoder (not illustrated) may be used to compress and encode the data; correspondingly, during the process of reading data from the memory 130 into the processing circuit array 110, a decoder (not illustrated) may be used to decompress the data.

Figure 2B:
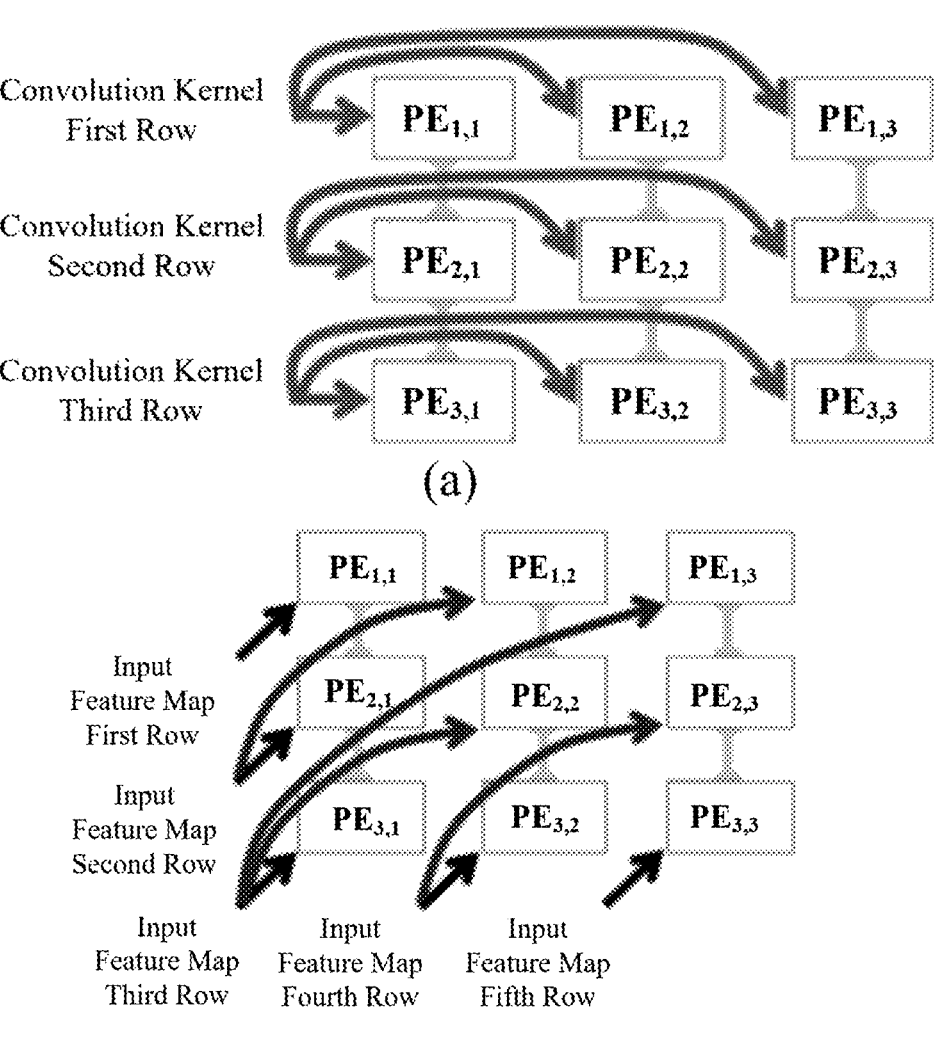
FIG. 2B illustrates three different data multiplexing methods employed for the processing circuit array illustrated in FIG. 2A.

FIG. 2B illustrates three different data multiplexing methods employed for the processing circuit array illustrated in FIG. 2A. The Neural-network Processing Unit may, for example, employ a Row Stationary (RS) data stream. The Row Stationary data stream can reduce the movement of all data types (such as Ifm, Flt and Psum/Ofm) with a higher data multiplexing rate, especially for the different properties of the convolution kernel, input image (or input feature map), and accumulated sum, as illustrated in FIG. 2B, taking a 5×5 input feature map, a 3×3 convolution kernel, and a obtained 3×3 output feature map as examples, three different data multiplexing methods are used for the processing circuit array illustrated in FIG. 2A, respectively:

(a) the weight data of the convolution kernel is laterally multiplexed between PEs;

(b) the data of the input feature map is diagonally multiplexed between PEs;

(c) the output row data (accumulated sum) is longitudinally multiplexed between PEs (vertical accumulation).

More specifically, in FIG. 2B, each PE in the 3×3 PE array may perform, for example, a one-dimensional convolutional operation. As illustrated in the FIG. 2B, for the lateral multiplexing of the weight data of the convolution kernel between PEs, the three processing circuits (PE 1.1, PE 1.2, and PE 1.3) in the first row of the PE array are respectively input to the first row of the convolution kernel; the three processing circuits in the second row of the PE array are respectively input to the second row of the convolution kernel; and the three processing circuits in the third row of the PE array are respectively input to the third row of the convolution kernel. For the diagonal multiplexing of the data of the input feature map between PEs, the first row of the input feature map is input to PE 1.1; the second row of the input feature map is input to PE 2.1 and PE 1.2; . . . , and so on. Correspondingly, for the longitudinal multiplexing of the output row data (accumulated sum) between PEs, the first row of the accumulated sum (output feature map) is output in the first column of the PE array; the second row of the accumulated sum is output in the second column of the PE array; and the third row of the accumulated sum is output in the third column of the PE array. In the above-mentioned data multiplexing method, the input feature map, convolution kernel and output feature map have different mapping relationships with the PE array.

In addition, although the processing circuit (PE) array 110 has multiple rows and multiple columns of processing circuits, for example, 12 rows×12 columns of processing circuits, but compared with some network layers with larger size or smaller size, or network layers with multiple channel outputs, in order to perform the computation, the input feature map and/or the convolution kernel of the network layer needs to be split and mapped respectively.

Figure 2C:
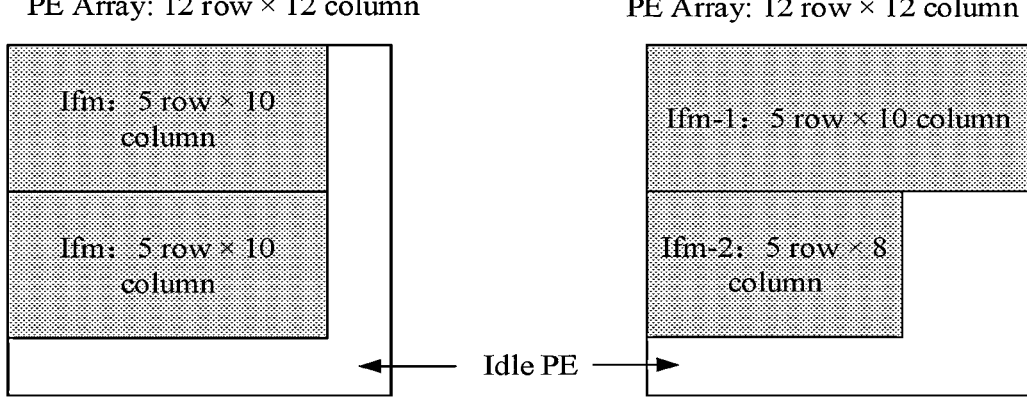
FIG. 2C illustrates an exemplary mapping method employed for the processing circuit array illustrated in FIG. 2A.

FIG. 2C illustrates an exemplary mapping method employed for the processing circuit array illustrated in FIG. 2A. For example, as illustrated on the left side of FIG. 2C, for a single-channel input feature map (Ifm) with 5 rows×10 columns, the image pixels of the input feature map may be directly mapped to the processing circuits of the processing circuit array one by one; in addition, in order to perform the parallel operation, the above-mentioned input feature map may also be longitudinally copied (repeated) once, or the input feature maps of other channels may be input, thereby improving the utilization of PE. Nonetheless, there are still free processing circuits in the row and column directions.

As illustrated on the right side of FIG. 2C, for a single-channel input feature map (Ifm) with 5 rows×20 columns, it needs to be split laterally into two sub input feature maps Ifm-1 and Ifm-2 with 5 rows×12 columns and 5 rows×8 columns, respectively, so as to be input to the processing circuit array 110 and mapped to the processing circuits of the processing circuit array accordingly. In this case, there are still free processing circuits in the column direction.

There are great differences in various parameters after mapping between different network layers of different neural network algorithms or the same neural network algorithm. For example, referring to FIG. 1B again, the output feature map generally includes multiple dimensions of F/E/M. Therefore, in order to accurately locate a pixel, it is necessary to know the coordinate value of the pixel in the F/E/M dimension. In addition, referring to FIG. 1A again, the shape (length, width and channel) of the data feature map is different between different network layers, and the output feature maps in the same network layer are written into a memory after the operation. However, in the same network layer, different parts of the output feature map corresponding to adjacent and consecutive parts may be written into non-consecutive storage locations in the memory due to different times generated during the computation process or spaced PE circuits corresponding to these parts. When the operation of the next network layer is to be carried out to read the output feature map from the memory as the input image data, for these non-consecutive storage locations, it is necessary to continuously hop addresses for reading. On the other hand, the bandwidth requirement of the Neural-network Processing Unit is usually very high, so a bus with a large bit width (such as 512 bits) is usually used. If hopping address is performed too frequent, it means that a large amount of unnecessary data may appear in the bus with a large bit width, which in turn leads to a significant reduction in the effective bandwidth, reduces system efficiency and increases power consumption.

At least one embodiment of the present disclosure provides a data processing method for a neural network, the neural network includes a plurality of network layers, the plurality of network layers include a first network layer, and the method includes: receiving at least two output feature data subsets, obtained by a processing circuit array for at least two different portions of the first network layer, from the processing circuit array; splicing and combining the at least two output feature data subsets according to positions of the at least two different portions in the first network layer to obtain a reorganized data subset; and writing the reorganized data subset into a destination storage device.

At least one embodiment of the present disclosure provides a data processing device for a neural network, the neural network includes a plurality of network layers, the plurality of network layers include a first network layer, and the device includes a receiving circuit, a reorganization circuit, and a writing circuit. The receiving circuit is configured to receive at least two output feature data subsets, obtained by a processing circuit array for at least two different portions of the first network layer, from the processing circuit array; the reorganization circuit is configured to splice and combine the at least two output feature data subsets according to positions of the at least two different portions in the first network layer to obtain a reorganized data subset; and the writing circuit is configured to write the reorganized data subset into a destination storage device.

At least one embodiment of the present disclosure provides a data processing device for a neural network, including a processing circuit and a memory on which one or more computer program modules are stored; and the one or more computer program modules are configured to, when executed by the processing circuit, perform the above-mentioned data processing method.

At least one embodiment of the present disclosure provides a non-transitory readable storage medium, computer instructions are stored on the non-transitory readable storage medium, and the computer instructions, when executed by a processor, perform the above-mentioned data processing method.

At least one embodiment of the present disclosure provides a neural network processing device, including the above-mentioned data processing device, the processing circuit array, and the destination storage device, and the data processing device is coupled to the processing circuit array and the destination storage device.

The data processing method and data processing device for a neural network provided by the embodiments of the present disclosure can improve system efficiency and improve bus bandwidth utilization; and, in at least one embodiment, the read and write efficiency between the previous and next network layers in the neural network may be taken into account simultaneously, so that each network layer may be mapped according to the optimal processing circuit utilization in the case where the data formats or shapes of the previous network layer and the next network layer of the neural network are mutually independent.

Several embodiments of the data processing method and data processing device for a neural network of the present disclosure will be described below.

Figure 3:
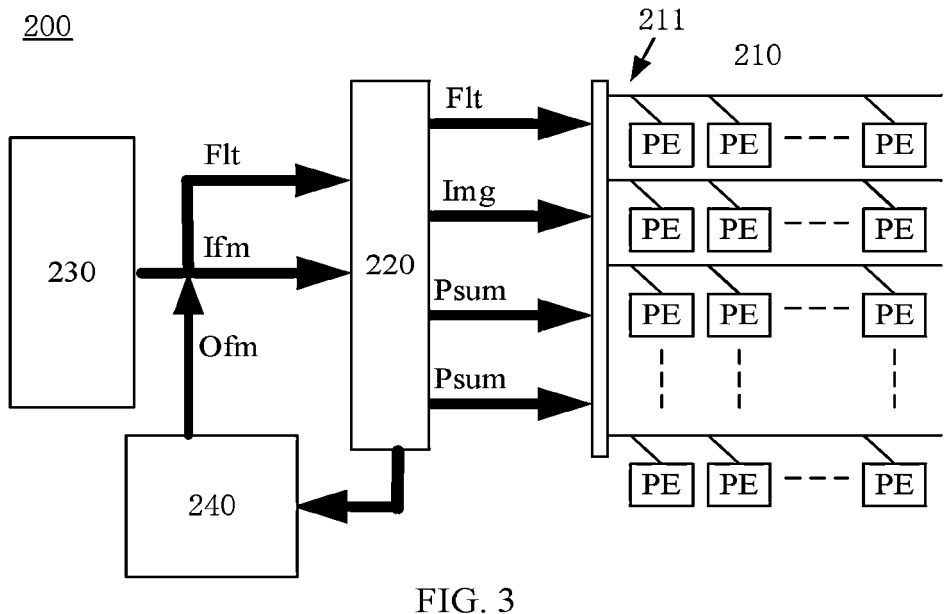
FIG. 3 illustrates a schematic diagram of a neural network processing device provided by at least one embodiment of the present disclosure.

FIG. 3 illustrates a schematic diagram of a neural network processing device provided by at least one embodiment of the present disclosure.

As illustrated in FIG. 3, the neural network processing device includes one or more processing circuit (PE) arrays 210, a global cache 220, a storage device 230 and a reorganization processing device 240.

For example, the neural network processing device includes a plurality of processing circuit arrays 210, for example, the processing circuit arrays 210 may share the global cache 220, the storage device 230 and the reorganization processing device 240, or the global cache 220, the storage device 230 and the reorganization processing device 240 are provided for each processing circuit array 210. For example, each processing circuit array 210 includes multiple rows and columns (e.g., 12 rows×12 columns or other dimensions) of processing circuits, these processing circuits are coupled to each other through an on-chip interconnect and share a global cache 220, and the on-chip interconnect is, for example, a network on-chip (NoC). For example, each processing circuit has a computing function, may be an arithmetic logic computing unit (ALU), and for example, may further have its own local cache. Each PE can access other PEs around it, the PE's own local cache and the global cache. The global cache 220 is further coupled to the storage device 230 through, for example, a data bus (arrow in the FIG. 3), the storage device 230 is, for example, a memory or other storage device, and the memory is, for example, a dynamic random-access memory device (DRAM). The embodiments of the present disclosure do not limit the type of the data bus, for example, it may be a PCIE bus or the like.

In the working process, for example, the data of the convolution kernel (Flt), the input feature map (Ifm), etc. required for computation of a network layer (e.g., a convolutional layer) is read from the storage device 230 into the global cache 220, and then from the global cache 220, the convolution kernel (Flt) and the input image (Img) are input to the processing circuit array 210 for computation, and the computation tasks for different image pixels are allocated to different processing circuits. The partial accumulated sum (Psum1) generated during the computation process is temporarily stored in the global cache 220, and if the partial accumulated sum (Psum1) generated previously is required for further accumulated operation in subsequent computation, the required partial accumulated sum (Psum2) may be read from the global cache 220 into the processing circuit array 210. The output feature map (Ofm) obtained by completing the operation of one convolutional layer may be output from the global cache 220 to the reorganization processing device 240, where different parts of the received output feature map are reorganized, and then the reorganized output feature map is written into the storage device 230 for storage through the data bus, and the saved reorganized output feature map is, for example, used for the computation of the next network layer (e.g., a convolution layer).

For example, the neural network processing device may, for example, employ a Row Stationary (RS) data stream. The Row Stationary data stream can reduce the movement of all data types (such as Ifm, Flt and Psum/Ofm) with a higher data multiplexing rate, which can refer to FIG. 2B-FIG. 2C, etc. The input feature map, convolution kernel and output feature map have different mapping relationships with the PE array, which is not repeated here.

Similarly, for example, for the data generated by the processing circuit array 210, especially in the case of sparse matrices, these data may be compressed and stored; a compression method for sparse matrices is RLC encoding, which can save storage space by encoding consecutive zeros into the amount of zeros. During the process of storing data from the processing circuit array 210 into the storage device 230, an encoder (not illustrated) may be used to compress and encode the data; correspondingly, during the process of reading data from the storage device 230 into the processing circuit array 210, a decoder (not illustrated) may be used to decompress the data.

The neural network that the neural network processing device is configured to process may include a plurality of network layers, and the plurality of network layers include a first network layer. For example, the neural network may be a Convolutional Neural Network (CNN), a Deep Neural Network (DNN), a Recurrent Neural Network (RNN), etc., which is not limited in the embodiments of the present disclosure. For example, the first network layer may be an input layer, a convolutional layer, a pooling layer, and the like. The input data (such as an input image or an input feature map) of the network layer may be single-channel or multi-channel, and the output data of the network layer may be single-channel or multi-channel. For example, the size of the input data of the network layer (e.g., row×column) is larger than the size of the processing circuit array (e.g., row×column), so in order to perform the computation, the input feature map and/or convolution kernel of the network layer need to be split and mapped accordingly.

The different parts of the output feature map received by the reorganization processing device 240 from the global cache 220 should have been arranged consecutively, but due to the above-mentioned splitting, mapping, etc., as well as the different time to reach the global cache 220 or the different positions of the processing circuit array used, they become no longer consecutive. The reorganization processing device 240 can reorganize these parts so that they become consecutive again, so that they can be consecutively written to the storage device 230 through the bus, so the system efficiency of the neural network processor may be improved and the bus bandwidth utilization may be improved; and through the reorganization operation, in at least one embodiment, even if the input feature maps of the previous and next network layers have different shapes, the read and write efficiency between the previous and next network layers in the neural network may be taken into account simultaneously.

FIG. 4 illustrates a schematic diagram of a data processing method for a neural network provided by at least one embodiment of the present disclosure.

For example, the data processing method may be executed by the reorganization processing device 240 of the above-mentioned neural network processing device. As illustrated in FIG. 4, the data processing method includes steps S101 to S102:

step S101: receiving at least two output feature data subsets, obtained by a processing circuit array for at least two different portions of the first network layer, from the processing circuit array;

step S102: splicing and combining the at least two output feature data subsets according to positions of the at least two different portions in the first network layer to obtain a reorganized data subset; and step S103: writing the reorganized data subset into a destination storage device.

For example, the above-mentioned processing circuit array may be the processing circuit array 210 illustrated in FIG. 3, and the destination storage device may be the storage device 230 illustrated in FIG. 3. As mentioned above, the neural network involved in the method may include a plurality of network layers, and the plurality of network layers include the first network layer. The first network layer is mapped to the processing circuit array during the computation process, and at least two output feature data subsets are correspondingly obtained for at least two different portions of the first network layer.

For example, at least two different portions of the first network layer may be at least two different sub-matrices, or may be at least two different data elements (e.g., image pixels), so that after computation, corresponding at least two output feature data subsets may be obtained. The output feature data subset may be, for example, a sub-matrix in the output feature map, or data elements (such as feature map pixels). The embodiments of the present disclosure do not limit this.

When the at least two output feature data subsets are spliced and combined, the at least two output feature data subsets are spliced and combined according to the positions of the at least two different portions in the first network layer to obtain the reorganized data subset. For example, referring to FIG. 2B, the input feature map, convolution kernel and output feature map have different mapping relationships with the PE array, and in the case where the output feature map computed by the current network layer is served as the input for the computation of the next network layer, the mapping relationship with the PE array will change. For another example, referring to the right side of FIG. 2C, the elements in the 12th and 13th columns that originally belonged to the same row in the input feature map are separated to be no longer consecutive. After the processing circuit array performs the operation, the output feature data obtained by them respectively also becomes to be no longer consecutive. Therefore, the output feature data obtained by them respectively are spliced and combined (reorganized) through the method according to at least one embodiment of the present disclosure, so as to become consecutive, for example.

For example, in at least one example of the embodiments of the present disclosure, the step S101, that is, receiving at least two output feature data subsets, obtained by a processing circuit array for at least two different portions of the first network layer, from the processing circuit array, a specific example of which may include: obtaining the at least two output feature data subsets from different processing circuits of the processing circuit array in a same operating cycle or different operating cycles, or obtaining the at least two output feature data subsets from a same processing circuit in different operating cycles; and performing address mapping according to the different processing circuits or a same processing circuit of the processing circuit array and a mapping mode in which an input feature map of the first network layer are input to the processing circuit array, and obtaining positions of the at least two different portions in the first network layer.

For example, the mapping mode in which the input feature map of the first network layer is input to the processing circuit array may refer to FIG. 2C (but not limited to this case). According to the size of the processing circuit array and the input feature map, the input feature map may be split to be mapped separately. For example, different portions of the input feature map may also be mapped to different processing circuit arrays of the Neural-network Processing Unit, respectively.

For example, in at least one example of the embodiments of the present disclosure, the above-mentioned step S101, that is, receiving at least two output feature data subsets, obtained by a processing circuit array for at least two different portions of the first network layer, from the processing circuit array, a specific example of which may further include: caching the at least two output feature data subsets for the splicing and combining in response to obtaining the at least two output feature data subsets in the different operating cycles.

In the case where the at least two output feature data subsets are obtained in different operating cycles, in order to be able to reorganize the at least two output feature data subsets, it is usually necessary to cache the output feature data subset that arrives first, and then perform splicing and combining. For example, by analyzing the position (coordinates) of the output feature data subset that arrives first in the output feature map, it can be determined that the output feature data subset that arrives first is not consecutive with the currently cached output feature data subset, so the output feature data subset that arrives first needs to be reorganized with other output feature data subsets, and in this case, the output feature data subset that arrives first may be cached.

For example, in at least one example of the embodiments of the present disclosure, step S102, that is, splicing and combining the at least two output feature data subsets according to positions of the at least two different portions in the first network layer to obtain the reorganized data subset, a specific example of which may include: performing coordinate scanning according to the positions of the at least two different portions in the first network layer to obtain coordinates of the at least two output feature data subsets in an output feature map of the first network layer; and splicing and combining the at least two output feature data subsets according to the result of the coordinate scanning to obtain the reorganized data subset.

As mentioned above, in order to analyze the position (coordinates) of the output feature data subset in the output feature map, it can be obtained by coordinate scanning, and obtained by coordinate scanning according to the position of the output feature data subset in the first network layer. Then, the at least two output feature data subsets may be spliced and combined according to the result of coordinate scanning to obtain the reorganized data subset.

For example, in at least one example of the embodiments of the present disclosure, the plurality of network layers further include a second network layer adjacent to the first network layer, and the output feature map of the first network layer is served as the input feature map of the second network layer, in this case, splicing and combining the at least two output feature data subsets according to the positions of the at least two different portions in the first network layer to obtain the reorganized data subset, which may include: determining second positions of the at least two output feature data subsets in the output feature map of the first network layer according to first positions of the at least two different portions in the first network layer, and splicing and combining the at least two output feature data subsets according to the second positions to obtain the reorganized data subset.

In this example, the output feature map of the first network layer is served as the input feature map of the second network layer. Therefore, when splicing and combining the at least two output feature data subsets to obtain the reorganized data subset, it is necessary to refer to the shape of the input feature map, so that the input operation is smoother. Therefore, even in the case where the data formats or shapes of the previous network layer (the first network layer) and the next network layer (the second network layer) of the neural network are mutually independent, each network layer may be mapped according to the optimal processing circuit utilization, so that the mapping of the previous and next two network layers is decoupled.

In this example, for example, splicing and combining the at least two output feature data subsets according to the second positions to obtain the reorganized data subset may include: consecutively arranging the at least two output feature data subsets to obtain the reorganized data subset in response to the at least two output feature data subsets being correspondingly consecutively arranged in the input feature map of the second network layer.

In this example, for example, splicing and combining the at least two output feature data subsets according to the second positions to obtain the reorganized data subset may include: splicing and combining the at least two output feature data subsets according to a mode in which the input feature map of the second network layer is input to the processing circuit array and according to the second positions to obtain the reorganized data subset.

In this example, for example, splicing and combining the at least two output feature data subsets according to the mapping mode in which the input feature map of the second network layer is input to the processing circuit array and according to the second positions to obtain the reorganized data subset may include: consecutively arranging the at least two output feature data subsets to obtain the reorganized data subset in response to the at least two output feature data subsets being consecutively input into the processing circuit array correspondingly according to the mode and the second positions.

Likewise, for example, the mapping mode in which the input feature map of the second network layer is input to the processing circuit array may refer to FIG. 2C (but not limited to this case).

For example, in at least one example of the embodiments of the present disclosure, step S103, that is, writing the reorganized data subset into the destination storage device, a specific example of which may include: writing the reorganized data subset obtained by consecutively arranging the at least two output feature data subsets into the destination storage device by performing a single storage operation through a data bus.

If the width of the data bus allows, the reorganized data subset obtained by consecutively arranging at least two output feature data subsets may be written into the destination storage device by performing a single storage operation through the data bus. For example, the width of the data bus is 512 bits (or may be 256 bits, 128 bits, etc.), that is, the single storage operation can transfer data with 512 bits. If the length of the reorganized data subset obtained by consecutively arranging at least two output feature data subsets is less than 512 bits, the reorganized data subset may be written into the destination storage device through a single storage operation. In this case, the difference between the length of the reorganized data subset and the width of the data bus is filled with other data.

In the above-mentioned example, the step S103, that is, writing the reorganized data subset into the destination storage device, may further include: acquiring a storage address and a valid data length of the reorganized data subset. Correspondingly, writing into the destination storage device by performing the single storage operation through the data bus may include: performing the single storage operation to write into the destination storage device using the storage address and the valid data length. For example, the valid data length may be the width of the data bus, or, for example, may be ½ or ¼ of the width of the data bus.

FIG. 5 illustrates a schematic diagram of a neural network processing device provided by another embodiment of the present disclosure.

As illustrated in FIG. 5, the neural network processing device includes one or more processing circuit arrays 310, a storage device 330 and a reorganization processing device 340, and does not need to include a global cache.

For example, the neural network processing device may include a plurality of processing circuit arrays 310, for example, the processing circuit arrays 310 may share the storage device 330 and the reorganization processing device 340, or provide the storage device 330 and the reorganization processing device 340 for each processing circuit array 310. For example, each processing circuit array 310 includes multiple rows and columns (e.g., 12 rows×12 columns or other dimensions) of processing circuits coupled to each other through an on-chip interconnect, and the on-chip interconnect is, for example, a network on chip (NoC) and shares the global cache 220. For example, each processing circuit has a computing function, such as an arithmetic logic computing unit (ALU), and further has a cache BF. Each PE can access the PE's own cache as well as other surrounding PEs and their cache BFs. In at least one example, in the processing circuit array 310, a plurality of processing circuits may also form a cluster, and in each cluster, a plurality of PEs share a cache BF with each other. The processing circuit array 310 is coupled to the storage device 330 through, for example, a data bus, and the storage device 330 is, for example, a memory, such as a dynamic random-access memory (DRAM). The present embodiment does not limit the type of the data bus, for example, it may be a PCIE bus or the like.

Similarly, the different parts of the output feature map received by the reorganization processing device 340 from the processing circuit array 310 should have been arranged consecutively, but due to the above-mentioned splitting, mapping, etc., as well as the different time to reach the cache BF or the different positions of the processing circuit array used, they become no longer consecutive. The reorganization processing device 340 can reorganize these parts so that they become consecutive again, so that they can be consecutively written to the storage device 330 through the bus, so the system efficiency of the neural network processor may be improved and the bus bandwidth utilization may be improved; and through the reorganization operation, in at least one embodiment, even if the input feature maps of the previous and next network layers have different shapes, the read and write efficiency between the previous and next network layers in the neural network may be taken into account simultaneously.

Figure 6:
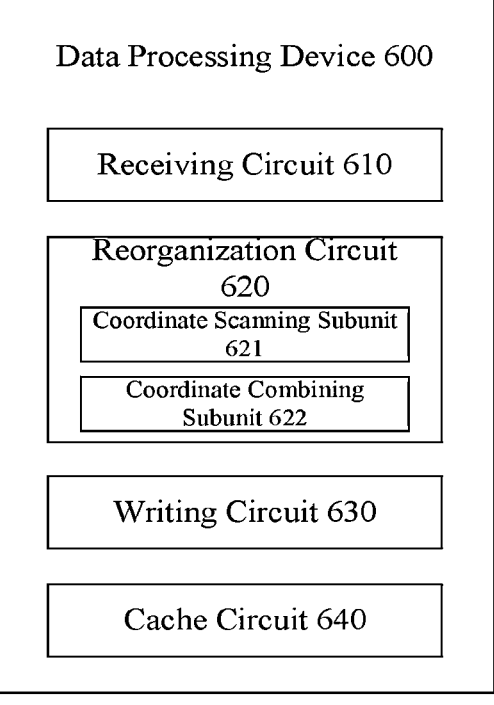
FIG. 6 illustrates a schematic diagram of a data processing device for a neural network provided by another embodiment of the present disclosure.

FIG. 6 illustrates a schematic diagram of a data processing device for a neural network provided by another embodiment of the present disclosure.

As illustrated in FIG. 6, the data processing device 600 includes a receiving circuit 610, a reorganization circuit 620 and a writing circuit 630. The receiving circuit 610 is configured to receive at least two output feature data subsets, obtained by a processing circuit array for at least two different portions of the first network layer, from the processing circuit array; the reorganization circuit 620 is configured to splice and combine the at least two output feature data subsets according to positions of the at least two different portions in the first network layer to obtain a reorganized data subset; and the writing circuit 630 is configured to write the reorganized data subset into a destination storage device.

The data processing device 600 of the present embodiment is, for example, used to implement the reorganization processing device in the neural network processing device of the above-mentioned embodiment, such as the above-mentioned reorganization processing device 240 or the reorganization processing device 340.

For example, in at least one example, writing the reorganized data subset into the destination storage device includes: writing the reorganized data subset obtained by consecutively arranging the at least two output feature data subsets into the destination storage device by performing a single storage operation through a data bus.

For example, in at least one example, the writing circuit 630 is further configured to acquire a storage address and a valid data length of the reorganized data subset, and perform the single storage operation to write into the destination storage device using the storage address and the valid data length.

For example, in at least one example, the receiving circuit 610 is further configured to: obtain the at least two output feature data subsets from different processing circuits of the processing circuit array in a same operating cycle or different operating cycles, or obtain the at least two output feature data subsets from a same processing circuit in different operating cycles; and perform address mapping according to the different processing circuits or a same processing circuit of the processing circuit array and a mapping mode in which an input feature map of the first network layer are input to the processing circuit array, and obtain positions of the at least two different portions in the first network layer.

For example, in at least one example, as illustrated in FIG. 6, the above-mentioned data processing device 600 may further include a cache circuit 640, and the cache circuit 640 is configured to cache the at least two output feature data subsets for the splicing and combining.

For example, in at least one example, as illustrated in FIG. 6, the reorganization circuit 620 includes a coordinate scanning subcircuit 621 and a coordinate combining subcircuit 622. The coordinate scanning subcircuit 621 is configured to perform coordinate scanning according to the positions of the at least two different portions in the first network layer to obtain coordinates of the at least two output feature data subsets in an output feature map of the first network layer; and the coordinate combining subcircuit 622 is configured to splice and combine the at least two output feature data subsets according to a result of the coordinate scanning to obtain the reorganized data subset.

For example, in at least one example, the cache circuit 640 includes a plurality of sub-cache circuits, and correspondingly, the reorganization circuit 620 is further configured to perform the splicing and combining by taking a bit width of each of the plurality of sub-cache circuits as a circuit to obtain the reorganized data subset; and the bus width written by the writing circuit 630 into the destination storage device is a multiple of the bit width of each of the plurality of sub-cache circuits.

Figure 7:
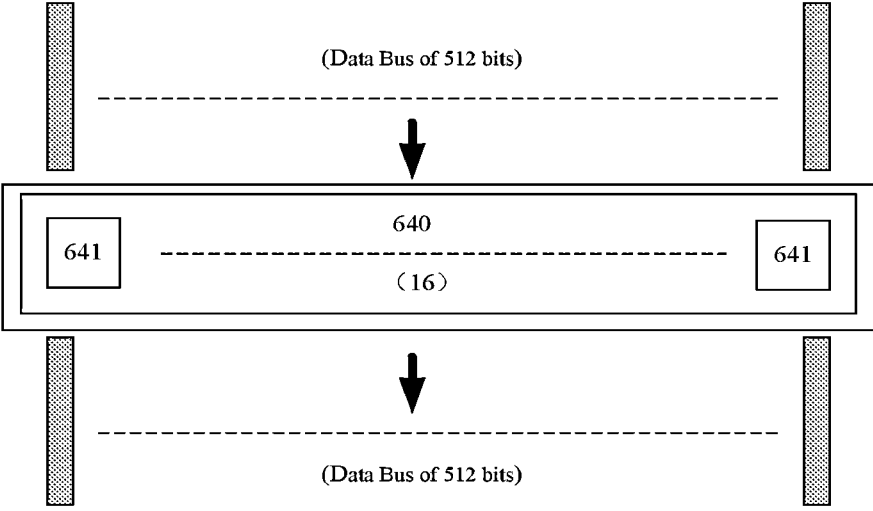
FIG. 7 illustrates a schematic diagram of a data processing device being coupled to a data bus according to at least one embodiment of the present disclosure.

FIG. 7 illustrates a schematic diagram of a data processing device being coupled to a data bus according to at least one embodiment of the present disclosure.

As illustrated in FIG. 7, the data processing device receives an initial output feature map computed by the network layer through a data bus with a width of 512 bits, and then reorganizes the initial output feature map and then sends it to the destination storage device (e.g., a memory) through a data bus with a width of 512 bits. For example, the cache circuit 640 of the data processing device includes 16 sub-cache circuits 641, and each sub-cache circuit 641 corresponds to the 32-bit width of the data bus, so for example, the data processing device may use each sub-cache circuit 641 as a circuit for splicing and combining, the reorganization is thus achieved, so that addresses can be easily hopped during the reorganization process without affecting the bandwidth utilization.

Figure 8:
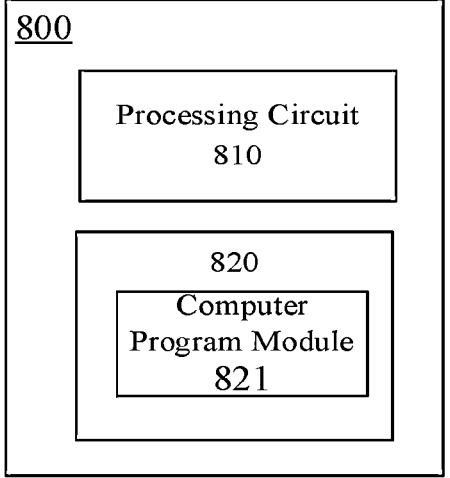
FIG. 8 illustrates a schematic diagram of a data processing device provided by at least one embodiment of the present disclosure.

FIG. 8 illustrates a schematic diagram of a data processing device provided by at least one embodiment of the present disclosure.

As illustrated in FIG. 8, the data processing device 800 includes a processing circuit 810 and a memory 820, and the memory 820 stores one or more computer program modules 821; and the one or more computer program modules 821 are configured to, when executed by the processing circuit 810, perform the data processing method according to any one of the above-mentioned embodiments.

At least one embodiment of the present disclosure further provides a non-transitory readable storage medium, and computer instructions are stored on the non-transitory readable storage medium, and the computer instructions, when executed by a processor, perform the data processing method according to any one of the above-mentioned embodiments.

For example, the non-transitory readable storage medium is implemented as a memory, such as a volatile memory and/or a non-volatile memory.

In the above-mentioned embodiments, the memory may be a volatile memory, for example, may include a random-access memory (RAM) and/or a cache, and the like. The non-volatile memory may include, for example, a read only memory (ROM), a hard disk, an erasable programmable read only memory (EPROM), a portable compact disk read only memory (CD-ROM), a USB memory, a flash memory, and the like. Various application programs and various data, and various data used and/or generated by the application programs may also be stored in the memory.

For the present disclosure, the following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only exemplary embodiments of the present disclosure, and are not intended to limit the protection scope of the present disclosure, and the protection scope of the present disclosure is determined by the appended claims.

What is claimed is:

1. A data processing method for a neural network, the neural network comprising a plurality of network layers, the plurality of network layers comprising a first network layer, and the method comprising:

receiving at least two output feature data subsets, obtained by a processing circuit array for at least two different portions of the first network layer, from the processing circuit array;

splicing and combining the at least two output feature data subsets according to positions of the at least two different portions in the first network layer to obtain a reorganized data subset; and writing the reorganized data subset into a destination storage device, wherein the plurality of network layers further comprises a second network layer, and an output feature map of the first network layer is served as an input feature map of the second network layer; and the splicing and combining the at least two output feature data subsets according to the positions of the at least two different portions in the first network layer to obtain the reorganized data subset comprises:

determining second positions of the at least two output feature data subsets in the output feature map of the first network layer according to first positions of the at least two different portions in the first network layer, and splicing and combining the at least two output feature data subsets according to the second positions to obtain the reorganized data subset.

2. The data processing method according to claim 1, wherein the splicing and combining the at least two output feature data subsets according to the second positions to obtain the reorganized data subset comprises:

consecutively arranging the at least two output feature data subsets to obtain the reorganized data subset in response to the at least two output feature data subsets being correspondingly consecutively arranged in the input feature map of the second network layer.

3. The data processing method according to claim 1, wherein the splicing and combining the at least two output feature data subsets according to the second positions to obtain the reorganized data subset comprises:

splicing and combining the at least two output feature data subsets according to a mode in which the input feature map of the second network layer is input to the processing circuit array and according to the second positions to obtain the reorganized data subset.

4. The data processing method according to claim 3, wherein the splicing and combining the at least two output feature data subsets according to the mode in which the input feature map of the second network layer is input to the processing circuit array and according to the second positions to obtain the reorganized data subset comprises:

consecutively arranging the at least two output feature data subsets to obtain the reorganized data subset, in response to the at least two output feature data subsets being consecutively input into the processing circuit array correspondingly according to the mode and the second positions.

5. The data processing method according to claim 2, wherein the writing the reorganized data subset into the destination storage device comprises:

writing the reorganized data subset obtained by consecutively arranging the at least two output feature data subsets into the destination storage device by performing a single storage operation through a data bus.

6. The data processing method according to claim 5, wherein the writing the reorganized data subset into the destination storage device further comprises:

acquiring a storage address and a valid data length of the reorganized data subset, wherein the writing the reorganized data subset into the destination storage device by performing the single storage operation through the data bus comprises:

performing the single storage operation to write into the destination storage device using the storage address and the valid data length.

7. The data processing method according to claim 1, wherein the receiving at least two output feature data subsets, obtained by the processing circuit array for at least two different portions of the first network layer, from the processing circuit array comprises:

obtaining the at least two output feature data subsets from different processing circuits of the processing circuit array in a same operating cycle or in different operating cycles, or obtaining the at least two output feature data subsets from a same processing circuit in different operating cycles; and performing address mapping, according to the different processing circuits or the same processing circuit of the processing circuit array and a mapping mode in which an input feature map of the first network layer are input to the processing circuit array, and obtaining positions of the at least two different portions in the first network layer.

8. The data processing method according to claim 7, wherein the receiving at least two output feature data subsets, obtained by the processing circuit array for at least two different portions of the first network layer, from the processing circuit array further comprises:

caching the at least two output feature data subsets for the splicing and combining, in response to obtaining the at least two output feature data subsets in the different operating cycles.

9. The data processing method according to claim 7, wherein the splicing and combining the at least two output feature data subsets according to positions of the at least two different portions in the first network layer to obtain the reorganized data subset comprises:

performing coordinate scanning according to the positions of the at least two different portions in the first network layer to obtain coordinates of the at least two output feature data subsets in the output feature map of the first network layer; and splicing and combining the at least two output feature data subsets according to a result of the coordinate scanning to obtain the reorganized data subset.

10. The data processing method according to claim 4, wherein the writing the reorganized data subset into the destination storage device comprises:

writing the reorganized data subset obtained by consecutively arranging the at least two output feature data subsets into the destination storage device by performing a single storage operation through a data bus.

11. The data processing method according to claim 10, wherein the writing the reorganized data subset into the destination storage device further comprises:

acquiring a storage address and a valid data length of the reorganized data subset, wherein the writing the reorganized data subset into the destination storage device by performing the single storage operation through the data bus comprises:

performing the single storage operation to write into the destination storage device using the storage address and the valid data length.

12. A data processing device for a neural network, the neural network comprising a plurality of network layers, the plurality of network layers comprising a first network layer, and the device comprising:

a receiving circuit, configured to receive at least two output feature data subsets, obtained by a processing circuit array for at least two different portions of the first network layer, from the processing circuit array;

a reorganization circuit, configured to splice and combine the at least two output feature data subsets according to positions of the at least two different portions in the first network layer to obtain a reorganized data subset; and a writing circuit, configured to write the reorganized data subset into a destination storage device, wherein the plurality of network layers further comprises a second network layer, and an output feature map of the first network layer is served as an input feature map of the second network layer; and wherein the reorganization circuit comprises:

a coordinate scanning subcircuit, configured to perform coordinate scanning according to the positions of the at least two different portions in the first network layer to obtain coordinates of the at least two output feature data subsets in an output feature map of the first network layer; and a coordinate combining subcircuit, configured to splice and combine the at least two output feature data subsets according to a result of the coordinate scanning to obtain the reorganized data subset.

13. The data processing device according to claim 12, wherein the receiving circuit is further configured to:

obtain the at least two output feature data subsets from different processing circuits of the processing circuit array in a same operating cycle or different operating cycles, or obtain the at least two output feature data subsets from a same processing circuit in different operating cycles; and perform address mapping according to the different processing circuits or a same processing circuit of the processing circuit array and a mapping mode in which an input feature map of the first network layer are input to the processing circuit array, and obtain positions of the at least two different portions in the first network layer.

14. The data processing device according to claim 12, further comprising:

a cache circuit, configured to cache the at least two output feature data subsets for the splicing and combining.

15. The data processing device according to claim 14, wherein the cache circuit comprises a plurality of sub-cache circuits, the reorganization circuit is further configured to perform the splicing and combining by taking a bit width of each of the plurality of sub-cache circuits as a unit to obtain the reorganized data subset, and a bus width written by the writing circuit into the destination storage device is a multiple of the bit width of each of the plurality of sub-cache circuits.

16. A data processing device for a neural network, comprising:

a processing circuit, and a memory on which one or more computer program modules are stored, wherein the one or more computer program modules are configured to, when executed by the processing circuit, perform a data processing method for a neural network, the neural network comprising a plurality of network layers, the plurality of network layers comprising a first network layer, and the method comprising:

receiving at least two output feature data subsets, obtained by a processing circuit array for at least two different portions of the first network layer, from the processing circuit array;

splicing and combining the at least two output feature data subsets according to positions of the at least two different portions in the first network layer to obtain a reorganized data subset; and writing the reorganized data subset into a destination storage device, wherein the plurality of network layers further comprises a second network layer, and an output feature map of the first network layer is served as an input feature map of the second network layer; and the splicing and combining the at least two output feature data subsets according to the positions of the at least two different portions in the first network layer to obtain the reorganized data subset comprises:

determining second positions of the at least two output feature data subsets in the output feature map of the first network layer according to first positions of the at least two different portions in the first network layer, and splicing and combining the at least two output feature data subsets according to the second positions to obtain the reorganized data subset.

17. A non-transitory readable storage medium, wherein computer instructions are stored on the non-transitory readable storage medium, and the computer instructions, when executed by a processor, perform the data processing method according to claim 1.

18. A neural network processing device, comprising:

the data processing device according to claim 12, the processing circuit array, and the destination storage device, wherein the data processing device is coupled to the processing circuit array and the destination storage device.

* * * * *